July 27, 1971
E. S. BREMERMAN
3,595,774
LAY-IN ELECTRODE FOR ELECTROLYTIC STABILIZATION
OF REFRIGERATION CONDENSERS
Filed Oct. 18, 1968
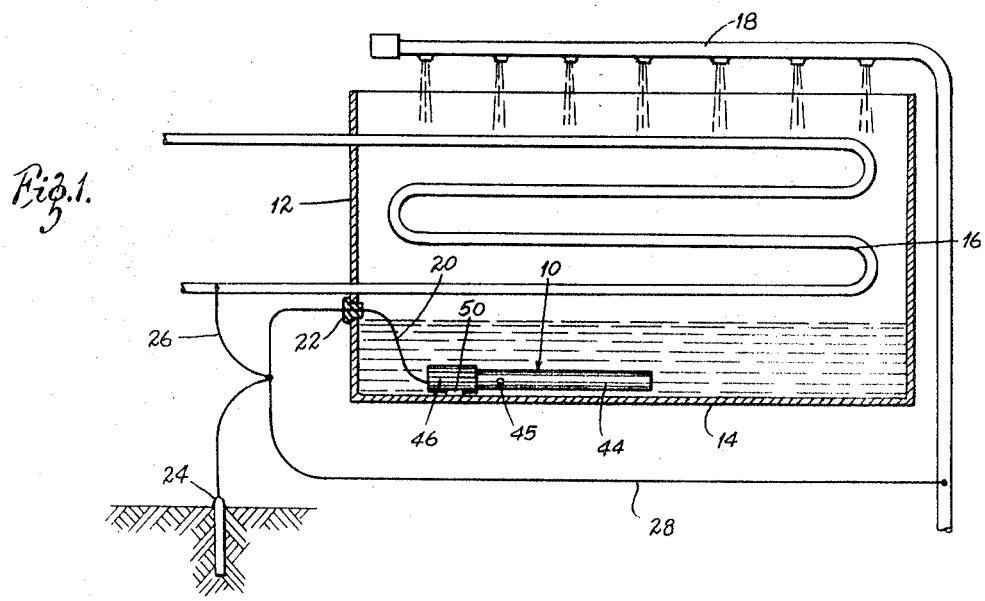
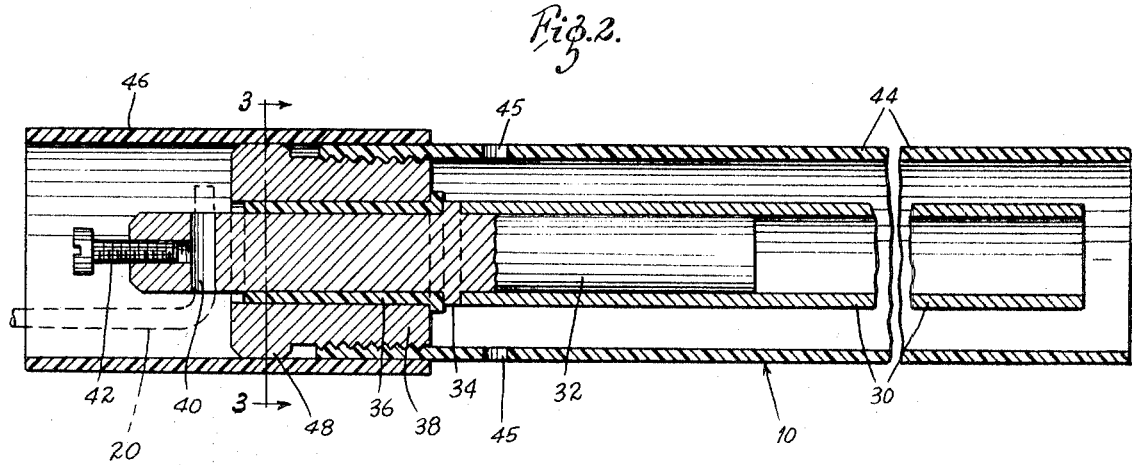
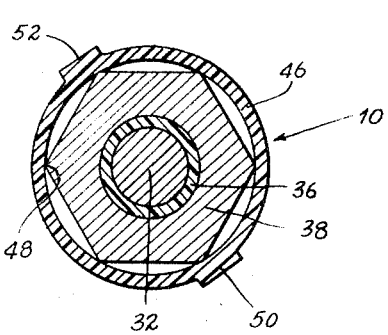
INVENTOR:
EUGENE S. BREMERMAN
BY Kingsland, Rogers, Ezell, Eilers & Robbins
ATTORNEYS

# United States Patent Office 3,595,774
Patented July 27, 1971

3,595,774
LAY-IN ELECTRODE FOR ELECTROLYTIC STABILIZATION OF REFRIGERATION CONDENSERS
Eugene S. Bremerman, 82 Whitehall Court,
St. Louis, Mo. 63144
Filed Oct. 18, 1968, Ser. No. 768,768
Int. Cl. C23f 13/00
U.S. Cl. 204—196
3 Claims

ABSTRACT OF THE DISCLOSURE

Inhibition of scale formation and inhibition of electrolytic corrosion is accomplished by an insulated electrode which can be simply laid in a reservoir underlying refrigeration condenser coils.

---

The instant electrode is an improvement over my prior electrode protected by U.S. Pat. No. 2,893,938, for Electrolytic Stabilization Apparatus for Water Systems, patented July 7, 1959.

SUMMARY OF THE INVENTION

The insulated electrode is simply installed in the reservoir underlying the refrigeration condenser coils by simply laying it on the bottom of the reservoir. An insulated open ended tube surrounding the electrode is provided with detents to prevent rolling and the electrode within the tube may be simply connected to a cable passing through the area above the water line of the reservoir through an insulated fitting to a grounded connection and to the condenser coil. Installation may be made by relatively unskilled workmen and once installed requires no maintenance or control.

The above features are objects of this invention and further objects will appear in the detailed description as follows and will be otherwise apparent to those skilled in the art.

For the purpose of illustration of the invention, there is shown in the accompanying drawings a preferred embodiment thereof installed in a refrigeration condenser system. It is to be understood that these drawings are for the purpose of example only and that the invention is not limited thereto.

In the drawings:

FIG. 1 is a view in section through a refrigeration condenser showing the electrode laid in place on the floor of the reservoir underneath the refrigeration coil;

FIG. 2 is an enlarged view in section through the longitudinal axis of the electrode; and FIG. 3 is a view in section taken on the line 3—3 of FIG. 2.

Referring now to the drawings, the electrode is generally designated by the reference numeral 10 in FIG. 1. It is shown there installed in a reservoir 12 having a floor 14. The reservoir is provided with refrigeration coils 16 underlying a spray tube 18 to provide water spray to condense the fluid within the condenser coil 16. The electrode is connected by a cable 20 through a wall of the reservoir by means of an insulated plug 22 to a ground 24 and by a cable 26 to the condenser tube 16 at a point exterior of the reservoir. The spray tube is grounded by cable 28 extending to the incoming cold water line and the ground.

The electrode 10 is shown in detail in FIGS. 2 and 3. As there shown, it is comprised of an electrode probe element in the form of a brass tube 30 which fits upon a brass electrode element 32 in abutment against a flange 34. A nylon sleeve bushing 36 is fitted over the rear end of the electrode element 32 and receives a threaded sleeve-like base element 38.

The electrical connection to the electrode is accomplished by means of a drilled hole 40 which receives the cable 20 for ready insertion therethrough. A tightening screw 42 provides for a fixed connection.

The insulation means to provide for insulated protection of the electrode is accomplished by means of the plastic tube 44 which is provided with openings 45 and is threaded at the rear end to fit over the threaded portion of the base 38. A concentric plastic tube 46 is press fitted over the rear of the plastic tubing 44 and an enlarged hub portion 48 of the base 38. Stop elements or detents 50 and 52 are provided at the exterior of the plastic tubing 46 to prevent the electrode from rolling as best shown in FIGS. 1 and 3.

USE

The electrode 10 of this invention is shown in use in a refrigeration system in FIG. 1. As there shown, the electrode is simply laid on the floor 14 of the reservoir and connected with the cable 20 passing through the insulated plug installed in the side wall of the reservoir. The cable 20 is then grounded and connected to the exterior portion of the condenser coils 16 outside the wall of the reservoir.

The insulated electrode of this invention effectively prevents scale formation upon the refrigeration coils 16 when they are cooled by the water spray from the spray tube 18. By the use of the insulated plastic tubing, possible arching of the lime deposits between the electrode through the proble element 30 and any metallic surfaces adjacent to it is prevented. Accordingly, by means of this invention, there has been provided a simply installed insulated electrode assembly which can be laid upon a floor of the reservoir in a refrigeration condenser containing water to prevent electrolytic corrosion, scale formation, and algae formation.

Various changes and modifications may be made within this invention as will be readily apparent to those skilled in the art. Such changes and modifications are within the scope and teaching of this invention as defined by the claims appended hereto.

What is claimed is:

1. An electrode assembly for use in water systems, said electrode assembly comprising an elongated rigid tubular electrode element said tubular electrode element being supported at its rear end by an interfitting solid electrode element and abutting against a circumferential flange thereon, a base element fitting around said solid electrode element, a sleeve member of insulating material interfitted between said base element and said solid electrode element, said sleeve member abutting against said flange, and a tubular protective shield of insulating material concentric with and enclosing said tubular electrode element and said solid electrode element.

2. The electrode assembly of claim 1 in which said base element is provided with an exterior hub element, said tubular protective shield being comprised of a first tubular member fitted over a reduced portion of said base element and a second tubular member press-fitted over said hub and the rear portion of said first tubular member.

3. The electrode assembly of claim 1 in which said tubular protective shield is provided with an opening communicating the interior with the exterior adjacent the front of said base element.

References Cited

UNITED STATES PATENTS

| | | | |
|---|---|---|---|
| 2,222,979 | 11/1940 | Lemaire | 204—286 |
| 2,315,897 | 4/1943 | Hansell | 204—197 |
| 2,471,531 | 5/1949 | McIntyre et al. | 204—286 |
| 2,846,385 | 8/1958 | Buchan | 204—197 |
| 2,893,938 | 7/1959 | Bremerman | 204—196 |
| 3,470,077 | 9/1969 | Higgins | 204—286 |

TA-HSUNG TUNG, Primary Examiner

U.S. Cl. X.R.

62—506; 204—147, 286, 297